June 28, 1960

L. OVERN 2,942,859

APPARATUS FOR THE CONTINUOUS PREPARATION OF A
SOLUTION OF CONSTANT CONCENTRATION

Filed Jan. 28, 1957

INVENTOR
LEIF OVERN

By
Watson, Cole, Grindle & Watson
ATTORNEYS

Patented June 28, 1960

2,942,859

APPARATUS FOR THE CONTINUOUS PREPARATION OF A SOLUTION OF CONSTANT CONCENTRATION

Leif Overn, Moss, Norway, assignor to S. Haug Ellingsen & Co., Oslo, Norway

Filed Jan. 28, 1957, Ser. No. 636,728

2 Claims. (Cl. 259—7)

The present invention relates to an apparatus for continuous preparation of solutions of constant concentration, in particular apparatus adapted for dissolving a powder formed substance in water or other liquid.

The apparatus of the invention is of the type wherein the solution is prepared in a mixing tank provided with agitator, wherein the powder is automatically supplied until the desired degree of concentration is reached. This is achieved thereby that an agitator, which acts upon the discharge opening of a powder container is started by a float, the position of which depends upon the specific gravity of the solution, while the water supply source which supplies water to the mixing tank is adjusted by another float so as to maintain a constant liquid level in the tank.

According to one essential feature of the present invention, the two floats are arranged in one common or two individual pockets, or compartments, separated from the mixing tank but communicating with the same, so as to be positioned outside of the sphere of influence of the flows set up by the agitator, and, consequently, functioning with a greater accuracy than when positioned directly in the open tank.

The invention is now to be described in greater detail with reference to an embodiment of the apparatus shown in the accompanying drawing wherein Figure 1 is a side view of the apparatus.

Figure 1:
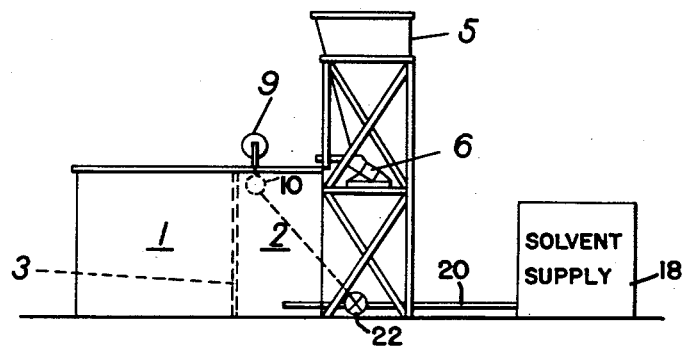
Figure 2:
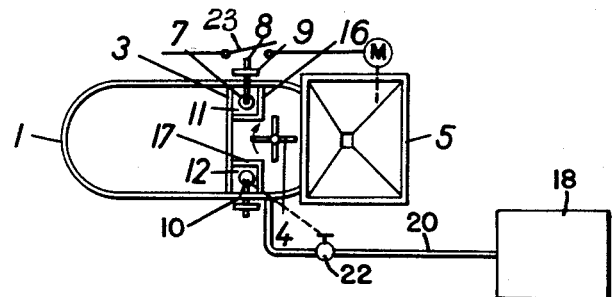
Figure 2 is a plan view of the same.
Figure 3:
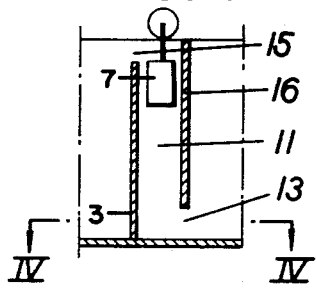
Figure 3 is a part sectional view, at a greater scale, along the line III—III of Figure 4.
Figure 4:
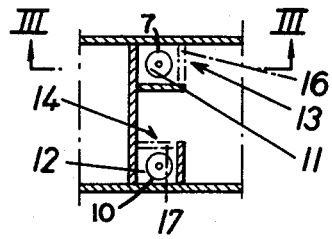
Figure 4 is a sectional view along the line IV—IV of Figure 3.

As shown in the drawing, the apparatus may consist essentially of an open tank which by means of a partition 3 is divided into a mixing section or compartment 2 and a storage section or separate compartment 1, the mixing section 2 being provided with an agitator 4. The mixing section 2 is supplied with powder or solute from a hopper 5 under the action of a vibrator 6, which is driven by an electric motor M, under the control of a float 7 which, under the influence of the specific gravity of the solution and through a lever 8 is acting upon an electric switch 23 to control the supply of current to the electric motor M, shown in Figure 2. The lever 8 is loaded by a weight 9 which may be displaced for the purpose of adjusting the float to different concentrations of the solution. A second float 10 is provided for the purpose of maintaining a constant liquid level in the mixing section.

Each of the floats 7 and 10, respectively, is in the embodiment shown in the drawing arranged in a separate pocket 11 and 12, respectively, extending from the bottom of the tank upwardly to the top of the same. The pockets are communicating with the liquid in the tank through openings 13 and 14, respectively, at the bottom of the pockets, and are situated in the rear wall 16 and 17, respectively of the pockets 11 and 12, respectively, with regard to the direction of rotation of the agitator, at which location the liquid or solvent is nearly at rest, but for the flow through the pocket or separate compartment 11 towards the overflow 15 into the storage section. By such arrangement, the floats are acting in a quiet liquid, undisturbed by the flows and whirls set up by the agitator in the mixing section proper. Such location of the float acting in dependence upon the specific gravity of the solution is also highly favourable as all liquid leaving the mixing section has to pass by the float.

As mentioned, the two floats may be positioned in one and the same compartment, separated from the mixing section by a partition extending across the mixing section, but such an arrangement is encumbered by the inconvenience, as compared with the provision of two separate pockets, that the space available for the agitator would then be restricted. As will appear from Figure 2 of the drawing, the circumference of the agitator may extend into the space between the pockets 11 and 12 in the arrangement comprising separate pockets.

The supply of water is delivered to the mixing tank 2 from a suitable source 18 through a suitable conduit 20. The second float 10 is connected to a suitable valve 22 in the conduit 20 to control the delivery of liquid to the mixing compartment 2 in a manner well known in the art.

I claim:

1. An apparatus for the continuous preparation of a solution of constant concentration comprising a tank including a mixing compartment, an agitator in said mixing compartment, means for containing a supply of each of a solvent liquid and a solute to be dissolved in said solvent, means associated with said mixing compartment for supplying thereto from said containing means each of said solvent liquid and said solute to be dissolved, float means independent from one another for controlling each of said supply means, at least one separate compartment in said tank separated from the said mixing compartment but communicating with the same through at least one opening situated near the bottom of the compartments, the solvent and dissolved solute passing from said mixing compartment through said opening into said last-mentioned compartment, said float means being arranged in and enclosed by said separate compartment, wherein the communicating opening between the said mixing compartment and the said float enclosing compartment is located in a compartment wall not subjected to direct impact of agitated liquid.

2. An apparatus as claimed in claim 1, wherein said separate compartment enclosing the said float means is divided into two compartments, one for each of the float means.

References Cited in the file of this patent

UNITED STATES PATENTS

| | | |
|---|---|---|
| 1,892,839 | Howard | Jan. 3, 1933 |
| 2,171,312 | Meyers | Aug. 29, 1939 |
| 2,288,719 | Kerr | July 7, 1942 |
| 2,570,375 | Pritchard | Oct. 9, 1951 |
| 2,638,248 | Alvord | May 12, 1953 |
| 2,660,190 | Blondel | Nov. 24, 1953 |
| 2,674,256 | Ullman | Apr. 6, 1954 |
| 2,724,581 | Pahl et al. | Nov. 22, 1955 |